United States Patent
Kim et al.

(10) Patent No.: US 12,325,048 B2
(45) Date of Patent: Jun. 10, 2025

(54) STEREO TACTILE SENSATION PROVIDING DEVICE

(71) Applicant: CK MATERIALS LAB CO., LTD., Seoul (KR)

(72) Inventors: Hyeong Jun Kim, Seoul (KR); In Beom Lee, Seoul (KR)

(73) Assignee: CK MATERIALS LAB CO., LTD., Seoul (KR)

( * ) Notice: Subject to any disclaimer, the term of this patent is extended or adjusted under 35 U.S.C. 154(b) by 756 days.

(21) Appl. No.: 17/421,901

(22) PCT Filed: Jun. 11, 2020

(86) PCT No.: PCT/KR2020/007587
§ 371 (c)(1),
(2) Date: Jul. 9, 2021

(87) PCT Pub. No.: WO2020/251280
PCT Pub. Date: Dec. 17, 2020

(65) Prior Publication Data
US 2022/0111416 A1  Apr. 14, 2022

(30) Foreign Application Priority Data

Jun. 12, 2019  (KR) .................. 10-2019-0069509
Jun. 11, 2020  (KR) .................. 10-2020-0070819

(51) Int. Cl.
*B06B 1/02* (2006.01)
(52) U.S. Cl.
CPC .................. *B06B 1/0207* (2013.01)

(58) Field of Classification Search
CPC .................. B06B 1/0207; G06F 3/01
See application file for complete search history.

(56) References Cited

U.S. PATENT DOCUMENTS

| 6,705,868 B1 | 3/2004 | Schleppenbach et al. |
| 8,982,067 B2 | 3/2015 | Sanma et al. |
| (Continued) | | |

FOREIGN PATENT DOCUMENTS

| JP | 2012221387 A | 11/2012 |
| JP | 2018010582 A | 1/2018 |
| (Continued) | | |

OTHER PUBLICATIONS

Dong-Soo Choi, "Haptic Rendering Method using Beat Phenomenon a Transparent Film-Type Actuator Array", pp. 1-67.

(Continued)

*Primary Examiner* — J. San Martin
(74) *Attorney, Agent, or Firm* — NKL Law; Jae Youn Kim

(57) ABSTRACT

Provided is a stereo tactile sensation providing device including a plurality of actuators spaced apart from each other, a connector for mounting the plurality of actuators thereon and including three or more tactile regions, and a controller for applying an operation signal to the actuators, wherein the controller applies a first signal for controlling the actuators to stimulate first tactile cells above a threshold, and a second signal for controlling the actuators to stimulate second tactile cells above the threshold, and wherein the connector provides synthetic tactile sensations generated by the plurality of actuators.

12 Claims, 20 Drawing Sheets

(56) References Cited

U.S. PATENT DOCUMENTS

| | | | |
|---|---|---|---|
| 10,055,019 B2 * | 8/2018 | Beran | G06F 3/0304 |
| 10,394,326 B2 * | 8/2019 | Ono | G06F 3/0416 |
| 10,488,929 B2 * | 11/2019 | Kim | G06F 3/01 |
| 2010/0085168 A1 * | 4/2010 | Kyung | G09B 21/003 |
| | | | 340/407.1 |
| 2017/0136354 A1 * | 5/2017 | Yamano | G06F 1/1632 |
| 2020/0241643 A1 | 7/2020 | Kim et al. | |
| 2020/0293111 A1 | 9/2020 | Gwak | |
| 2020/0356169 A1 * | 11/2020 | Belomoev | G08B 6/00 |
| 2021/0201632 A1 | 7/2021 | Kim et al. | |
| 2023/0205315 A1 * | 6/2023 | Rubin | A63F 13/24 |

FOREIGN PATENT DOCUMENTS

| | | | |
|---|---|---|---|
| KR | 20120116177 A | 10/2012 | |
| KR | 20170111091 A | 10/2017 | |
| KR | 20170129651 A | 11/2017 | |
| KR | 20180078121 A | 7/2018 | |
| KR | 10-2019-0040883 A | 4/2019 | |
| KR | 20190044528 A | 4/2019 | |
| WO | 98041962 A2 | 9/1998 | |
| WO | 2015151380 A1 | 10/2015 | |

OTHER PUBLICATIONS

International Search Report for PCT/KR2020l007587, dated Oct. 26, 2020, 7 pages.

Yong Hee You et al., Development of a Haptic Based Video and Audio Streaming Method, HCI 2009 Conference, 2009, pp. 538-541, Korea HCI Association, Korea.

* cited by examiner

FIG. 1
(a)
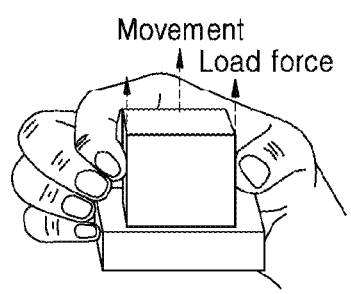
(b)
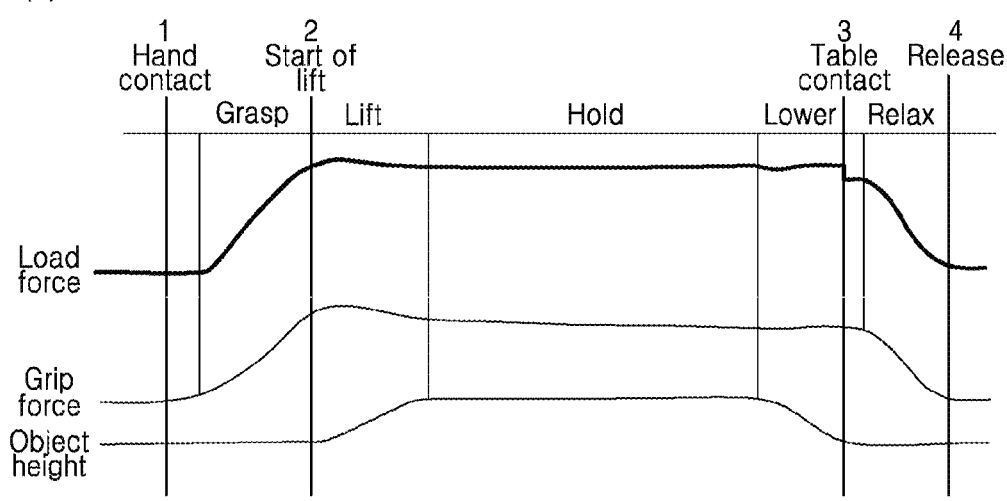
(c)
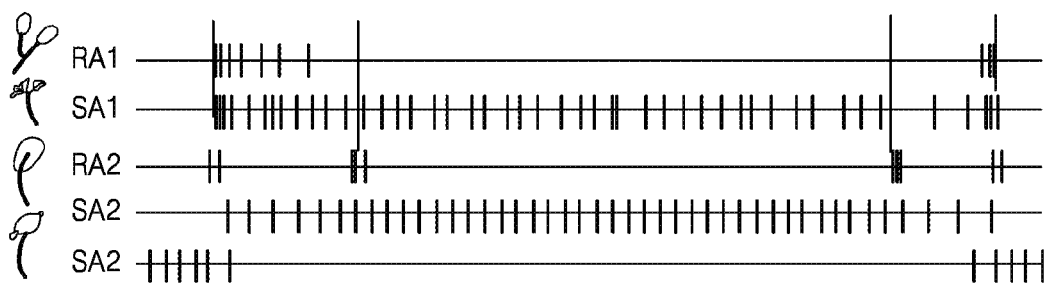

FIG. 3
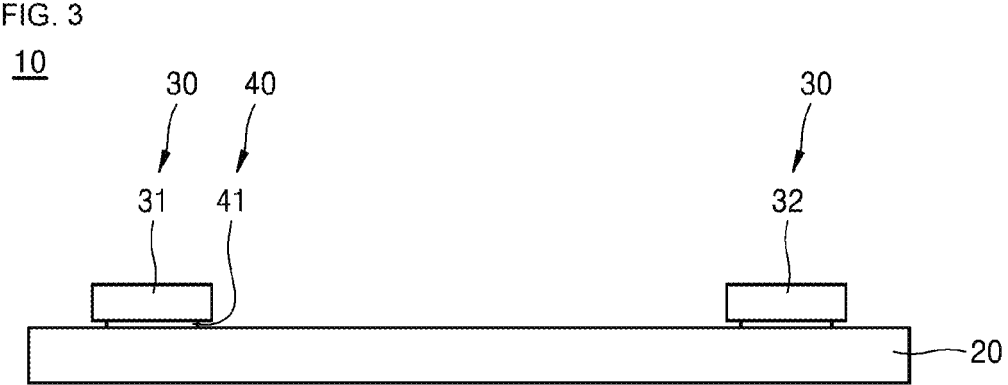
(a)
(b)

FIG. 5
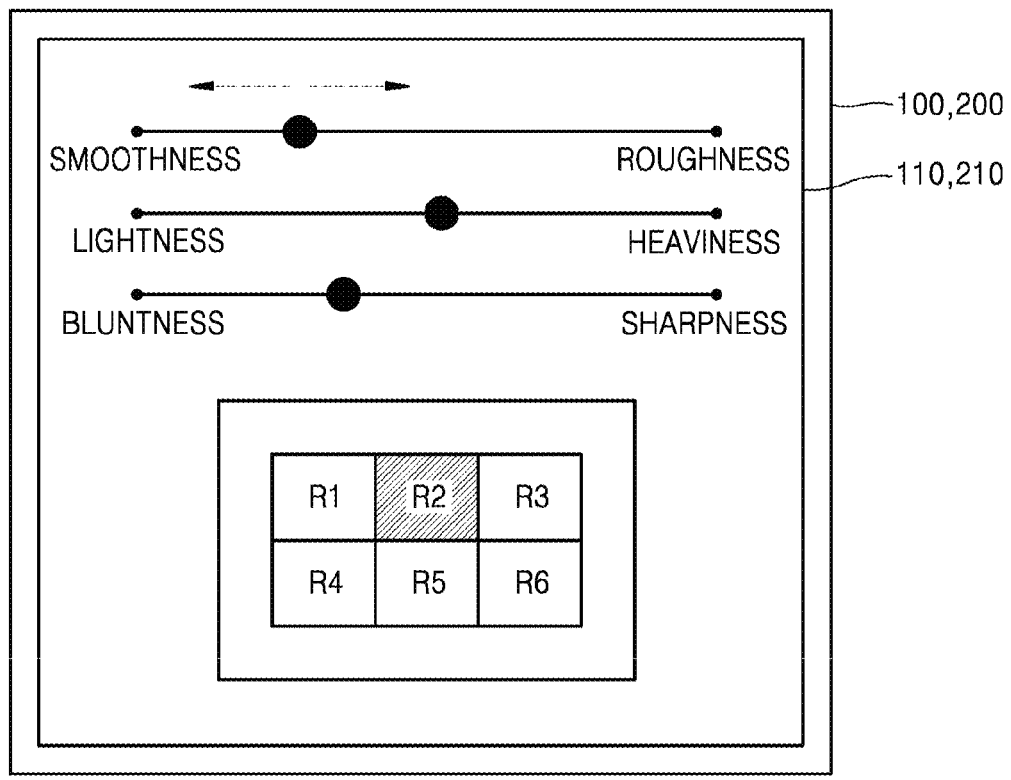
(a)
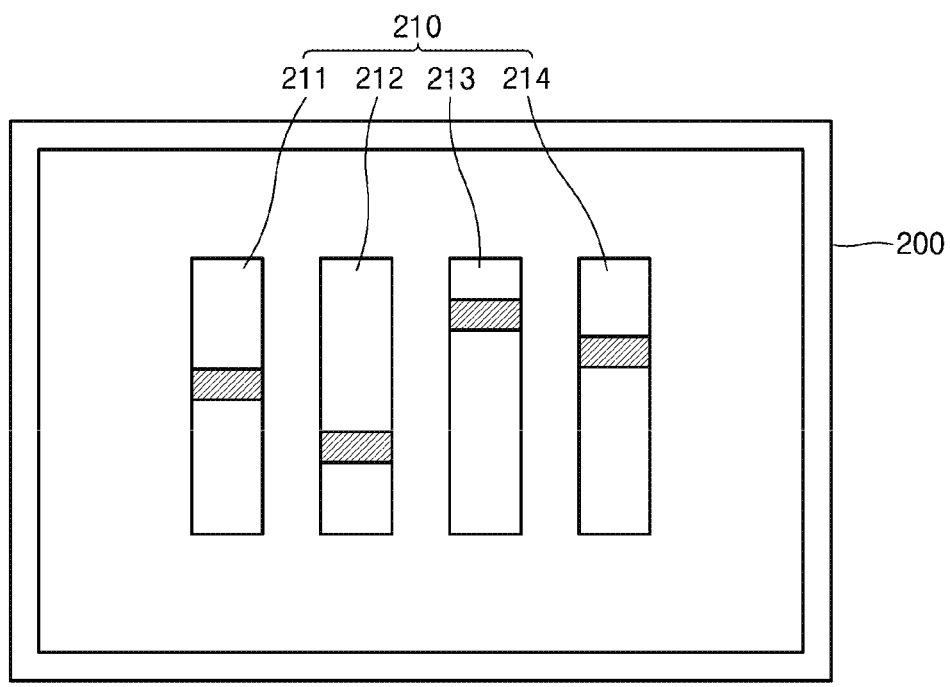
(b)

FIG. 6
(a)
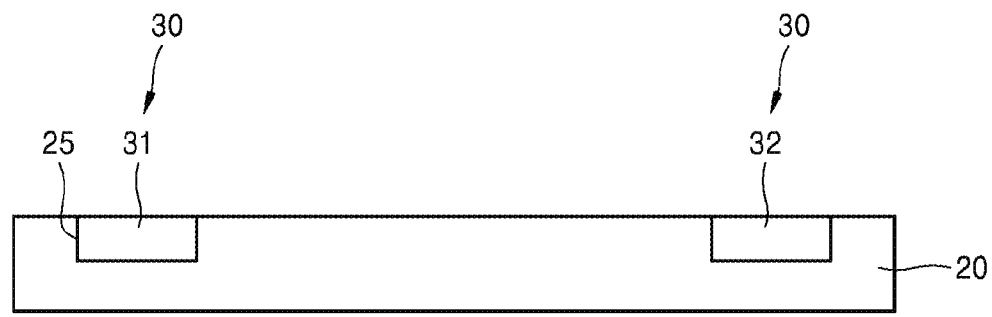
(b)

FIG. 7
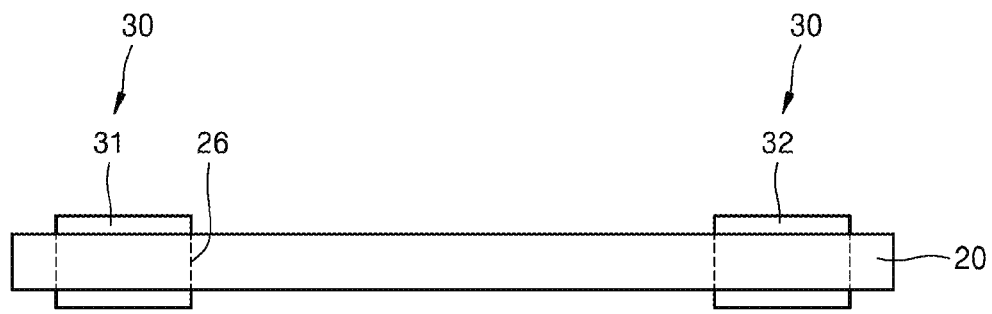
(a)
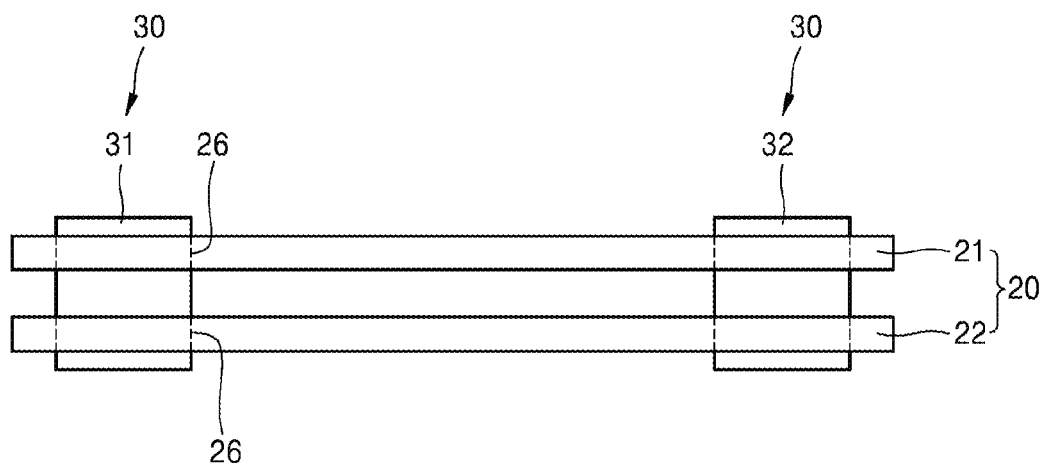
(b)

FIG. 8
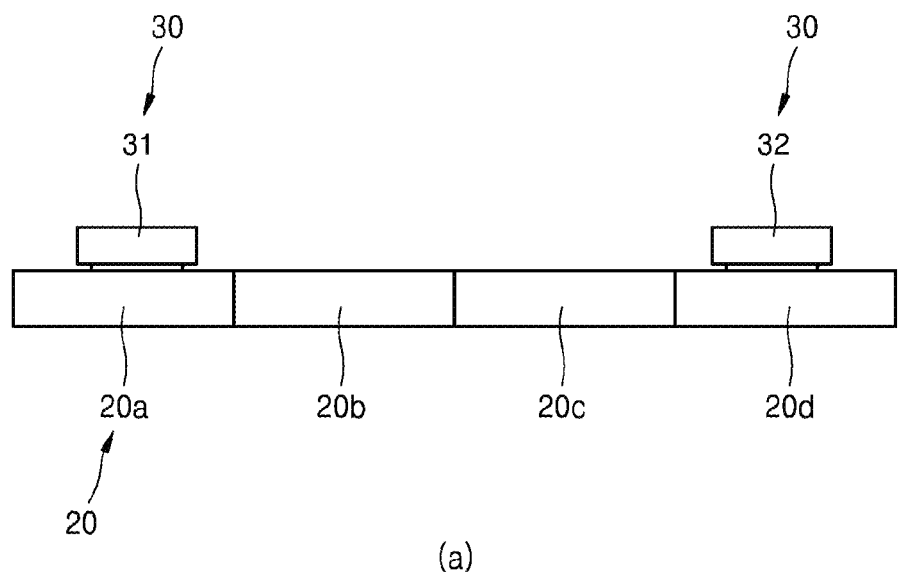
(a)
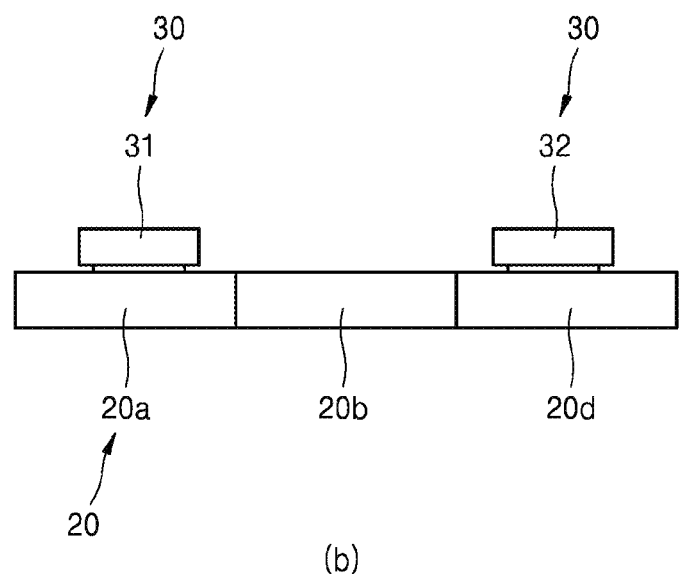
(b)

FIG. 9
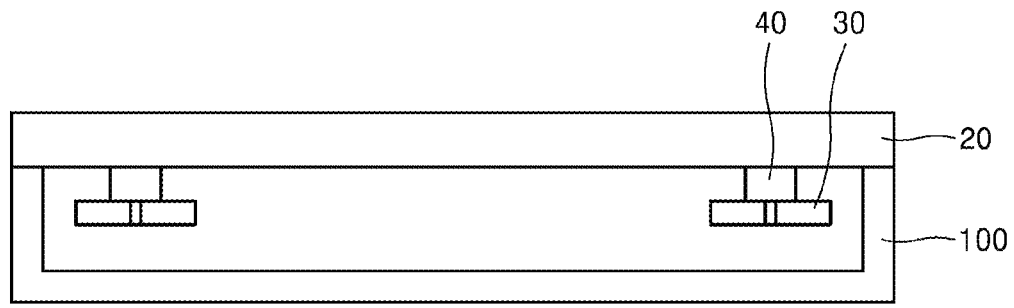
(a)
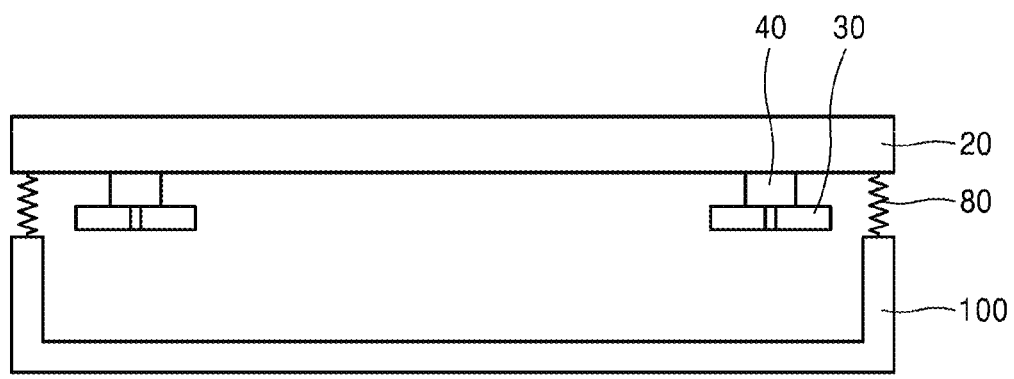
(b)

FIG. 10
(a)
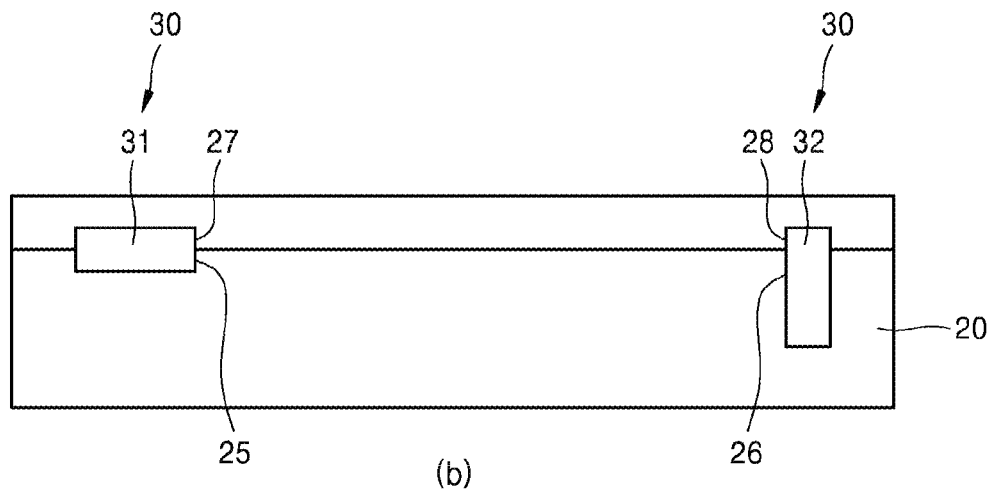
(b)
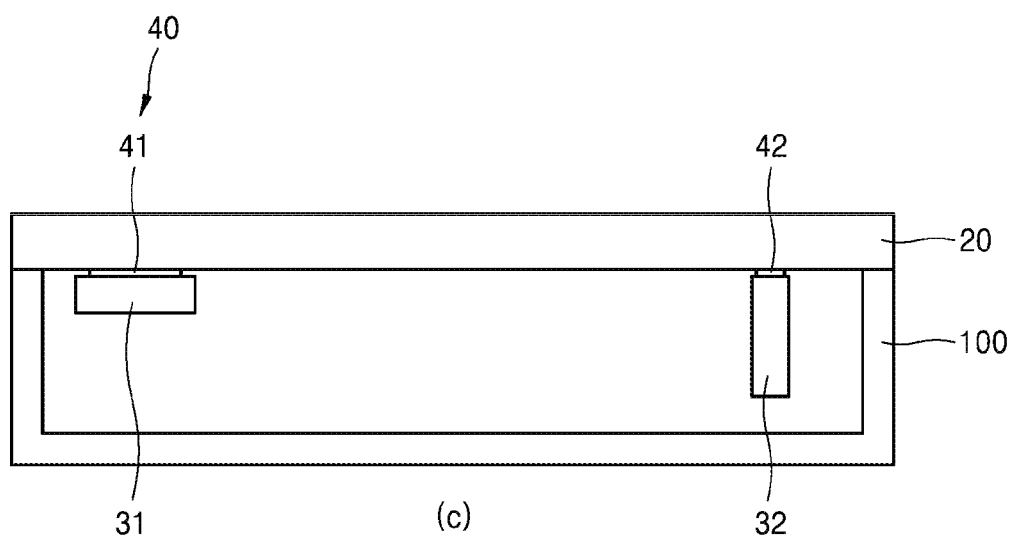
(c)

FIG. 11
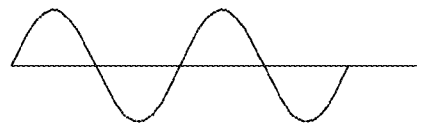 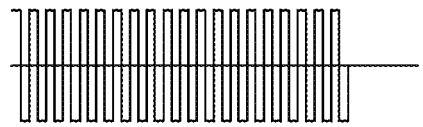
(a)
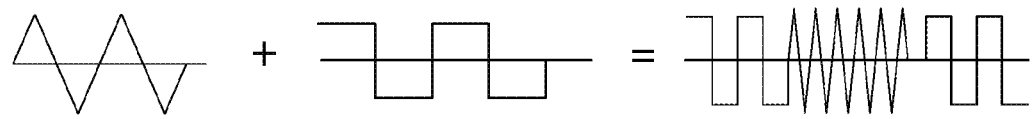
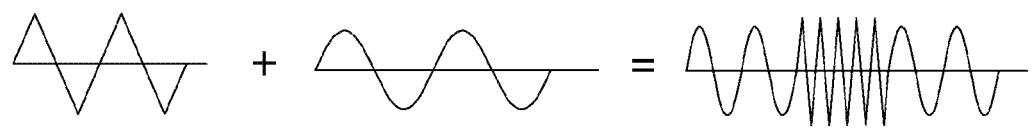
(b)

STEREO TACTILE SENSATION PROVIDING DEVICE

CROSS-REFERENCE TO RELATED APPLICATIONS

This application is a National Stage of International patent application PCT/KR2020/007587, filed on Jun. 11, 2020, which claims priority of foreign Korean patent application No. KR 10-2019-0069509, filed on Jun. 12, 2019 and KR 10-2020-0070819, filed on Jun. 11, 2020, the disclosures of which are incorporated by reference in their entirety.

TECHNICAL FIELD

The present invention relates to a stereo tactile sensation providing device, and more particularly, to a stereo tactile sensation providing device capable of providing various tactile sensations or a stereo tactile sensation by stimulating receptors by changing a frequency from a low-frequency band to a high-frequency band.

BACKGROUND ART

The human skin representatively includes four types of skin mechanoreceptors called Merkel cells, Meissner corpuscles, Ruffini corpuscles, and Pacinian corpuscles.

The Merkel cells operate in a frequency band ranging from 0 Hz to 3 Hz, and continuously respond to light touch and static stimulation to induce perception of a user. The Meissner corpuscles operate in a frequency band ranging from 3 Hz to 40 Hz, and mainly respond to dynamic deformation of the skin, e.g., vibration of the skin. The Ruffini corpuscles operate in a frequency band ranging from 15 Hz to 400 Hz, and respond to stretch or displacement of the skin. Lastly, the Pacinian corpuscles operate in a frequency band ranging from 10 Hz to 500 Hz, and rapidly respond to vibration on the skin.

The Merkel cells and the Ruffini corpuscles are slow-adapting (SA) receptors and continuously respond to deformation of the skin, and the Meissner cells and the Pacinian corpuscles are rapid-adapting (RA) receptors and respond to temporary deformation of the skin at the beginning and the end of stimulation applied to the skin.

Referring to FIG. 1, responses of receptors in a case when a user lifts up an object with fingertips are shown.

Herein, it is shown that SA1 and SA2 continuously respond while fingers are being bent to grasp the object and are holding the object, and RA1 and RA2 respond only when the object is initially touched, lifted, lowered, and released, i.e., only at the beginning and the end of touch.

Referring to FIG. 2, perceivable stimulation thresholds of skin mechanoreceptors based on a frequency band are shown. Herein, it is shown that a low-frequency band (e.g., 0 Hz to 20 Hz) requires greater stimulation compared to a high-frequency band (e.g., 150 Hz to 250 Hz), and a frequency band having the lowest threshold is about 200 Hz to 300 Hz.

Therefore, demands for haptic actuators capable of providing various tactile sensations by individually and selectively stimulating skin sensory receptors of a user are increasing.

The above-described background art is possessed or acquired by the inventor in the process of creating the present invention, and may not be necessarily disclosed to the public prior to the filing of the present invention.

DETAILED DESCRIPTION OF THE INVENTION

Technical Problem

The present invention provides a stereo tactile sensation providing device capable of providing various tactile sensations by individually and selectively stimulating skin sensory receptors of a user by driving a plurality of actuators in various frequency bands.

The present invention also provides a stereo tactile sensation providing device capable of providing a stereo tactile sensation to a user by driving a plurality of actuators.

However, the scope of the present invention is not limited thereto.

Technical Solution

According to an aspect of the present invention, there is provided a stereo tactile sensation providing device including a plurality of actuators spaced apart from each other, a connector on which the plurality of actuators is disposed, the connector including three or more tactile regions, and a controller for applying an operation signal to the actuators, wherein the controller applies a first signal for controlling the actuators to stimulate first tactile cells above a threshold, and a second signal for controlling the actuators to stimulate second tactile cells above the threshold, and wherein the connector provides synthetic tactile sensations generated by the plurality of actuators.

The controller may apply the operation signal for controlling at least one of voltages, frequencies, and waveforms of the plurality of actuators.

The controller may be connected to and receive a control signal from a tuner to apply the operation signal to the actuators, and the control signal may be a signal indicating a combination of intensities of at least two types of tactile sensations.

The tuner may be an application, or a tuning tool including scrolls, buttons, or an equalizer, and the application or the tuning tool may control at least one of types of tactile sensations, intensities of tactile sensations, and tactile regions.

The tuner may control a tactile sensation in a specific tactile region of the connector, and the tactile sensation in the specific tactile region of the connector may include at least one of smoothness, roughness, lightness, heaviness, bluntness, and sharpness.

The first tactile cells may include Merkel cells and Ruffini corpuscles as slow-adapting (SA) receptors, and the second tactile cells may include Meissner corpuscles and Pacinian corpuscles as rapid-adapting (RA) receptors.

The first tactile cells may include Merkel cells and Meissner corpuscles stimulated in a low-frequency band ranging from 0 Hz (not including 0 Hz) to 20 Hz, and the second tactile cells may include Ruffini corpuscles and Pacinian corpuscles stimulated in a high-frequency band ranging from 150 Hz to 250 Hz.

The connector provides tactile sensations including at least two of vibration, smoothness, bluntness, tapping, roughness, and sharpness.

Fixing guides may be mounted on the connector, and the actuators may be supported by the fixing guides to be fixed on the connector.

Recesses may be provided in the connector, and the actuators may be rested and fixed in the recesses.

Through-holes may be provided to penetrate the connector, and the actuators may be fitted through the through-holes.

The stereo tactile sensation providing device may include a plurality of connectors each having through-holes, and the actuators may be fitted through the through-holes of the plurality of connectors.

At least two of the plurality of connectors may be made of different materials.

The connector may be divided into a plurality of unit connectors, and the actuators may be mounted on at least two unit connectors.

At least one unit connector may be made of a material different from the material of the other unit connectors.

The connector may be made of plastic, metal, glass, rubber, or wood.

The actuators may be mounted on the connector via a coupling means including knobs or an adhesive material.

At least a part of the connector may be connected to a target product to provide tactile sensations to a user through the target product.

The connector may be connected to the target product via an elastic part.

One actuator may provide tactile sensations in a first direction, and a second direction opposite to the first direction, and at least two actuators are mounted on the connector at different angles to provide tactile sensations in different directions.

The actuators may be mounted at locations spaced apart from ends of the connector by a distance corresponding to 25% to 35% of a total length of the connector.

When the connector has a rectangular plate shape and two actuators are mounted at corners of the connector in a diagonal direction, vibration may be highest in intensity when a sine wave signal of 200 Hz to 250 Hz is applied to an actuator, and a tactile sensation of smoothness may increase in intensity at a location closer to where the intensity of vibration is high.

A tactile sensation of roughness may decrease in intensity at a location closer to the actuator to which the sine wave signal is applied, and a tactile sensation of sharpness may increase in intensity at a location closer to the actuator to which the sine wave signal is applied.

When a rectangular wave signal is applied to one of the actuators and a sine wave signal is applied to the other actuator, a tactile sensation of bluntness may increase in intensity at a location closer to the actuator to which the rectangular wave signal is applied.

Advantageous Effects

As described above, according to the present invention, various tactile sensations may be provided by individually and selectively stimulating skin sensory receptors of a user by driving a plurality of actuators in various frequency bands.

In addition, according to the present invention, a stereo tactile sensation may be provided to a user by driving a plurality of actuators.

However, the scope of the present invention is not limited to the above-described effects.

DESCRIPTION OF THE DRAWINGS

FIGS. 1A-1C are showing responses of receptors in a case when a user lifts up an object with fingertips.

FIGS. 3A-3B include cross-sectional views of a stereo tactile sensation providing device according to an embodiment of the present invention.

FIGS. 5A-5B include schematic views of a tuner according to various embodiments of the present invention.

FIGS. 6A-6B, 7A-7B, 8A-8B include cross-sectional views of stereo tactile sensation providing devices according to various embodiments of the present invention.

FIGS. 9A-9B include cross-sectional views showing connection forms between a stereo tactile sensation providing device and a target product, according to an embodiment of the present invention.

FIGS. 10A-10C include cross-sectional views showing stereo tactile sensation providing devices, and a connection form between the stereo tactile sensation providing device and a target product, according to an embodiment of the present invention.

FIGS. 11A-11B include schematic views for describing operation of a stereo tactile sensation providing device, according to an embodiment of the present invention.

DESCRIPTION OF REFERENCE NUMERALS

Figure 2:
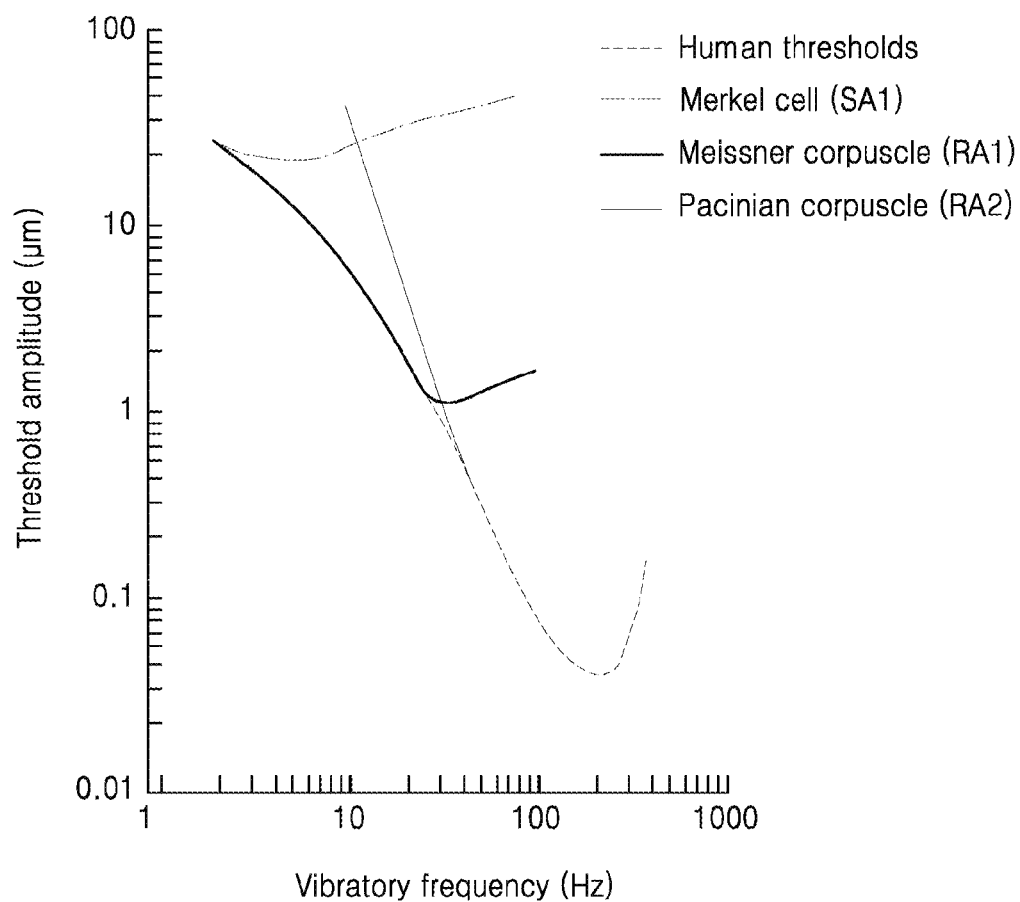
FIG. 2 is a graph showing perceivable stimulation thresholds of skin mechanoreceptors based on a frequency band.

10: Stereo tactile sensation providing device
20: Connector
20a to 20d: Unit connectors
30, 31, 32: Actuators, First and second actuators
40: Coupling means
41: Adhesive material
42: Knobs
50: Controller
60: Tuner
70: Fixing guides
80: Elastic part
100: Target product
200: Tuning tool

MODE OF THE INVENTION

The following detailed description of the invention will be made with reference to the accompanying drawings illustrating specific embodiments of the invention by way of example. These embodiments will be described in sufficient detail such that the invention may be carried out by one of ordinary skill in the art. It should be understood that various embodiments of the invention are different, but are not necessarily mutually exclusive. For example, a specific shape, structure, or characteristic described in relation to an embodiment may be implemented as another embodiment without departing from the scope of the invention. In addition, it should be understood that positions or arrangements of individual elements in each disclose embodiment may be changed without departing from the scope of the invention. Therefore, the following detailed description should not be construed as being restrictive and, if appropriately described, the scope of the invention is defined only by the appended claims and equivalents thereof. In the drawings, like reference numerals denote like functions, and the dimensions such as lengths, areas, and thicknesses may be exaggerated for clarity.

It will be understood that the terms "comprises", "comprising", "includes" and/or "including", when used herein, specify the presence of stated features, integers, steps, operations, elements, components, or groups thereof, but do not preclude the presence or addition of one or more other features, integers, steps, operations, elements, components, or groups thereof.

Hereinafter, the present invention will be described in detail by explaining embodiments of the invention with reference to the attached drawings, such that one of ordinary skill in the art may easily carry out the invention.

Figure 4:
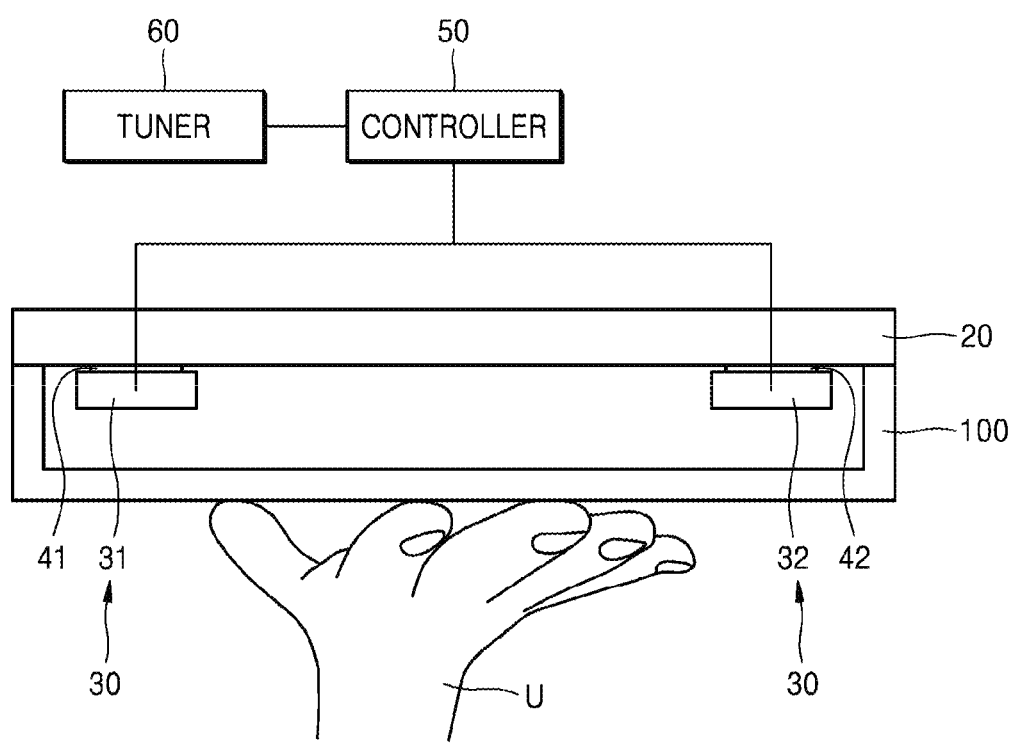
FIG. 4 is a schematic view showing the configuration of a stereo tactile sensation providing device according to an embodiment of the present invention.

FIG. 3 includes cross-sectional views of a stereo tactile sensation providing device 10 according to an embodiment of the present invention. FIG. 4 is a schematic view showing the configuration of the stereo tactile sensation providing device 10 according to an embodiment of the present invention. FIG. 5 includes schematic views of a tuner 60 according to various embodiments of the present invention.

Referring to FIG. 3, the stereo tactile sensation providing device 10 of the present invention may include a connector 20 and a plurality of actuators 30: 31 and 32, and a controller 50.

The connector 20 provides a region where the plurality of actuators 30 are mounted. The connector 20 may provide tactile sensations by itself, or be connected to a target product 100 (see FIG. 9) such that the target product 100 may provide the tactile sensations. The connector 20 may provide synthetic tactile sensations generated by the plurality of actuators 30.

The connector 20 may include a material capable of transferring tactile sensations when the actuators 30 vibrate, e.g., plastic, metal, glass, rubber, or wood.

To mount the plurality of actuators 30 thereon and to generate various tactile sensations based on driving of the actuators 30, the connector 20 may extend in a direction or have a wide plate shape. In another aspect, the connector 20 may have a form including a plurality of virtual regions for providing the tactile sensations. The plurality of virtual regions may be understood as regions for providing at least different tactile sensations, rather than physically clearly defined regions. For example, when two actuators 30 are disposed on the connector 20 as illustrated in FIG. 3, the connector 20 may be understood as including three regions such as a first region (e.g., a left region of the actuator 31), a second region (e.g., a right region of the actuator 32), and a third region (e.g., an region between the actuators 31 and 32), or as including more subdivided regions. Because a tactile sensation generated by each actuator 30 is attenuated and distributed on the connector 20, the connector 20 may include a plurality of virtual regions.

The actuators 30 may use known actuators, e.g., inertial actuators including linear resonant actuators for maximizing the intensity of vibration by using a resonant frequency, piezoelectric actuators driven using a piezoelectric element which has a beam or disk shape and instantaneously changes in size or shape due to an electric field, electroactive polymer actuators for generating vibration by using repeated movement of a mass attached on an electroactive polymer film, and electrostatic actuators driven using attraction generated between two sheets of glass charged with different types of charges, and repulsion generated when the sheets are charged with the same type of charges.

The plurality of actuators 30: 31 and 32 may be mounted on the connector 20. Although two actuators 31 and 32 are illustrated in FIG. 3, the number of actuators 30 may be adjusted considering, for example, the shape and size of the connector 20.

The controller 50 may apply an operation signal to the plurality of actuators 30. The controller 50 may use a known means capable of applying an operation signal for controlling voltages, frequencies, or waveforms of the actuators 30.

The controller 50 may be connected to the tuner 60 in a wireless or wired manner. The tuner 60 may transmit a control signal to the controller 50, and the control signal may be converted by the controller 50 into the operation signal for controlling the actuators 30.

The tuner 60 may be the target product 100 or a separate tuning tool 200. Herein, the target product 100 is a product to or in which the stereo tactile sensation providing device 10 is connected or embedded and which is used to provide tactile sensations when touched by a user's body part U, and may include a smartphone display, a terminal device such as a smartwatch, a joystick of a game console, a steering wheel of a vehicle, or the like. In the following description, the target product 100 is representatively assumed as a smartphone display.

For example, referring to (a) of FIG. 5, when the tuner 60 is the target product 100, the control signal may be transmitted using an application. The application may be driven on a display screen 110 of the target product 100, and scrolls for selecting types of tactile sensations (e.g., smoothness-roughness, lightness-heaviness, and bluntness-sharpness) and intensities of tactile sensations may be displayed on an application screen. Regions R1 to R6 corresponding to a plurality of tactile regions of the connector 20 may also be displayed to select a specific region R2 for which the types/intensities of tactile sensations are adjusted.

As another example, referring to (b) of FIG. 5, when the tuner 60 is the tuning tool 200, the tuning tool 200 may include scrolls, buttons, or an equalizer to physically control types of tactile sensations, intensities of tactile sensations, or tactile regions. Scrolls 210: 211, 212, 213, 214, . . . may correspond to the types of tactile sensations, and the intensities of tactile sensations may be adjusted by moving the scrolls 210 upward or downward. As illustrated in (a) of FIG. 5, the tuning tool 200 may also be, for example, a terminal device such as a smartphone or a smartwatch, or a remote controller, which does not directly include the stereo tactile sensation providing device 10. An application may be driven on a display screen 210 of the tuning tool 200, and the types of tactile sensations, the intensities of tactile sensations, or the tactile regions may be controlled using the application.

As such, the controller 50 may receive the control signal which is input when the user controls the tuner 60 (e.g., the target product 100 or the tuning tool 200), and thus apply the operation signal for controlling the actuators 30. The tuner 60 may be used as a medium for adjusting the operation signal applied to the actuators 30, and adjust a tactile sensation in a specific tactile region of the connector 20. The tactile sensation in the specific tactile region may include at least one of smoothness, roughness, lightness, heaviness, bluntness, and sharpness.

In particular, the present invention is characterized in that the tactile regions of the connector 20 provide synthetic tactile sensations due to operations of the plurality of actuators 30. An operation signal indicating different types/intensities of tactile sensations for the actuators 30 may be received through the controller 50, and synthetic tactile sensations generated by the plurality of actuators 30 may be provided through the connector 20. Different tactile sensations may be provided from the tactile regions based on the synthetic tactile sensations.

The different tactile sensations may mean that two or more of tactile sensations such as vibration, smoothness, bluntness, tapping, roughness, and sharpness are provided from the connector 20. Alternatively, the different tactile sensations may mean that two or more tactile sensations corresponding to the same type of tactile sensation (e.g., vibration) but having clearly distinguishable intensities or cycles are provided from the connector 20. To this end, voltages, frequencies, or waveforms of the actuators 30: 31 and 32 and locations thereof on the connector 20 may be controlled.

According to an embodiment, at least one of the plurality of actuators 30: 31 and 32 may be driven to stimulate first tactile cells above a threshold, and at least another of the plurality of actuators 30: 31 and 32 may be driven to stimulate second tactile cells above the threshold. To this end, the controller 50 may apply, to the corresponding actuators 30, a first signal instructing to stimulate the first tactile cells above the threshold, and a second signal instructing to stimulate the second tactile cells above the threshold. For example, the first tactile cells may include slow-adapting (SA) receptors such as Merkel cells and Ruffini corpuscles, and the second tactile cells may include rapid-adapting (RA) receptors such as Meissner corpuscles and Pacinian corpuscles.

According to another embodiment, at least one of the plurality of actuators 30: 31 and 32 may be driven in a low-frequency band (e.g., 0 Hz to 20 Hz), and at least another of the plurality of actuators 30: 31 and 32 may be driven in a high-frequency band (e.g., 150 Hz to 250 Hz). The actuator driven in the low-frequency band may stimulate receptors which respond well thereto (e.g., Merkel cells and Meissner corpuscles), and the actuator driven in the high-frequency band may stimulate receptors which respond well thereto (e.g., Ruffini corpuscles and Pacinian corpuscles).

As described above, according to the present invention, all four types of receptors may be stimulated and thus various tactile sensations may be effectively provided. In addition, because every region of the connector 20 provides a synthetic tactile sensation, various types of tactile sensations may be provided from different regions. That is, a stereo tactile sensation may be provided.

The actuators 30 may be mounted on the connector 20 via a coupling means 40.

For example, referring to (a) of FIG. 3, the plurality of actuators 30: 31 and 32 may be disposed on the connector 20 to be spaced apart from each other, and each actuator 30 may be connected to the connector 20 via an adhesive material 41. The adhesive material 41 may use any of an adhesive agent, adhesive tape, etc. as long as the actuators 30 may be adhered to the connector 20 and vibrations of the actuators 30 may be transferred to the connector 20.

As another example, referring to (b) of FIG. 3, each actuator 30 may be connected to the connector 20 via a knob 42. The knob 42 may use any form or structure capable of connecting the actuators 30 to the connector 20.

FIGS. 6 to 8 include cross-sectional views of the stereo tactile sensation providing device 10 according to various embodiments of the present invention.

Referring to (a) of FIG. 6, the plurality of actuators 30: 31 and 32 may be disposed on the connector 20, and fixing guides 70 may be mounted near the plurality of actuators 30. The fixing guides 70 may fix the actuators 30 on the connector 20.

For example, the fixing guides 70 may be adhered to or formed integrally with the connector 20. The fixing guides 70 may have various shapes including triangular, rectangular, and circular shapes. The fixing guides 70 may have a shape at least partially fitted to the shape of the actuators 30 such that portions of the actuators 30 are fitted to the fixing guides 70.

Referring to (b) of FIG. 6, the plurality of actuators 30: 31 and 32 may be mounted and fixed in the connector 20. The connector 20 may include recesses 25, and the actuators 30 may be inserted into the recesses 25.

For example, the actuators 30 may be fitted into the recesses 25. The recesses 25 may have various shapes and depths depending on the shape and size of the actuators 30.

Referring to (a) of FIG. 7, the plurality of actuators 30 may be fitted through the connector 20. Through-holes 26 may be provided to penetrate from a surface to the other surface of the connector 20, and portions of the actuators 30 may be inserted into the through-holes 26.

For example, the actuators 30 may be fixed with an adhesive means while being inserted in the through-holes 26. Alternatively, through-holes (not shown) may be provided in the actuators 30 and the connector 20 may be fitted through the through-holes.

Referring to (b) of FIG. 7, a plurality of connectors 20: 21 and 22 each having the through-holes 26 may be provided. Portions of the actuators 30 may be inserted into the through-holes 26 such that every actuator 30 may be inserted into the plurality of connectors 20.

For example, the plurality of connectors 20: 21 and 22 may be aligned in parallel along a lengthwise direction.

For example, the plurality of connectors 20 may have the same shape but be made of different materials. In this case, different tactile sensations may be provided from the first and second connectors 21 and 22 due to operations of the actuators 30. For example, when the first and second connectors 21 and 22 have a thin plate shape and are disposed very close to each other, the stereo tactile sensation providing device 10 may provide different tactile sensations from a first surface (e.g., the first connector 21) and a second surface opposite to the first surface (e.g., the second connector 22).

Referring to (a) of FIG. 8, the connector 20 may be divided into a plurality of unit connectors 20*a*, 20*b*, 20*c*, and 20*d*. The actuators 30 may be mounted on at least two unit connectors 20*a* and 20*d* from among the plurality of unit connectors 20*a*, 20*b*, 20*c*, and 20*d*.

For example, any one of the unit connectors 20*a*, 20*b*, 20*c*, and 20*d* may be made of a material different from the material of the others. When the unit connectors 20*a* and 20*d* at edges are made of different materials, different tactile sensations may be provided from left and right edge regions of the stereo tactile sensation providing device 10. When the unit connectors 20*b* and 20*c* in a center region are made of a different material, different tactile sensations may be provided from three regions, i.e., the left edge region, the right edge region, and the center region. For example, when the unit connectors 20*a* and 20*d* in the edge regions are made of a hard plastic material and the other unit connectors 20*b* and 20*c* are made of a rubber material, a tactile sensation having a delicate and short frequency (e.g., smoothness or vibration) may be provided from the edge regions and a tactile sensation having a strong and long frequency due to elastic force of rubber (e.g., bluntness or tapping) may be provided from the center region. Therefore, a different tactile sensation may be provided depending on a location touched by a user.

Referring to (b) of FIG. 8, the unit connectors 20*a*, 20*b*, 20*c*, and 20*d* divided from the connector 20 may be combined in an arbitrary manner. For example, the unit connectors 20*a*, 20*b*, 20*c*, and 20*d* may have a form of modules or blocks. Another type of the stereo tactile sensation providing device 10 may be produced by combining three unit connectors 20*a*, 20*b*, and 20*d* except for the unit connector 20*c*. Because the stereo tactile sensation providing device 10 is changed in length and shape, providable tactile sensations may also be changed. In addition, the stereo tactile sensation providing device 10 may be implemented in a detachable or modular manner.

FIG. 9 includes cross-sectional views showing connection forms between the stereo tactile sensation providing device 10 and the target product 100, according to an embodiment of the present invention.

Referring to (a) of FIG. 9, the stereo tactile sensation providing device 10 may be connected to various target products 100 to provide tactile sensations thereto.

For example, assuming that the target product 100 is a smartphone display, the stereo tactile sensation providing device 10 may serve as a case of the smartphone display. The connector 20 may be made of a material such as plastic or metal and serve as the entirety or a part of a rear case of the smartphone display. The actuators 30 may be mounted on the case and be disposed inside the smartphone, and tactile sensations generated by the plurality of actuators 30 may be transferred to the whole smartphone through the case (or the connector 20). Therefore, according to the stereo tactile sensation providing device 10 of the present invention, vibrations generated by the plurality of actuators 30 may be transferred along the surface of the connector 20 and thus tactile sensations may be provided in a multi-direction.

Referring to (b) of FIG. 9, in addition to the configuration of (a) of FIG. 9, an elastic part 80 may be mounted between the connector 20 and the target product 100 (e.g., a smartphone display). The elastic part 80 may use any of springs, a polymer, etc. which have elasticity. The elastic part 80 may enhance the effect of driving the actuators 30.

For example, the elastic part 80 may be stretched in a vertical direction as illustrated in (b) of FIG. 9 to increase a vertical driving width and intensity. As another example, the elastic part 80 may be mounted in a horizontal direction to increase a horizontal driving width and intensity, or may be mounted in a direction other than the vertical/horizontal direction.

Meanwhile, the elastic part 80 may be configured by forming a portion of the connector 20 to be elastic. In this case, the elastic part 80 may be provided as a portion of the case which is not adjacent to the smartphone display.

FIG. 10 includes cross-sectional views showing the stereo tactile sensation providing devices 10 (see (a) and (b) of FIG. 10), and a connection form between the stereo tactile sensation providing device 10 and the target product 100 (see (c) of FIG. 10), according to an embodiment of the present invention.

Referring to FIG. 10, in the stereo tactile sensation providing device 10 according to an embodiment, the plurality of actuators 30 are mounted on the connector 20 to be spaced apart from each other and to have different driving directions.

For example, when horizontally mounted, the actuators 30 may be driven in a first direction, and a second direction opposite to the first direction (e.g., upward and downward directions). One actuator 31 may be horizontally mounted on the connector 20 so as to be driven in upward and downward directions, and another actuator 32 may be vertically mounted on the connector 20 so as to be driven in leftward and rightward directions.

Referring to (a) of FIG. 10, the actuators 30 may be oriented to have different driving directions and be inserted into recesses 25 and 26 provided in the connector 20. The first and second recesses 25 and 26 may be provided in different shapes and angles to orient the actuators 30 to have different driving directions merely by inserting the actuators 30 thereinto.

Referring to (b) of FIG. 10, the connector 20 may further include a cover 23, and partial recesses 25 and 26 may be provided in the connector 20 whereas the other partial recesses 27 and 28 may be provided in the cover 23. A combination of the first recess 25 or 27 and the second recess 26 or 28 may have a shape corresponding to an actuator 30. The actuators 30 inserted into the recesses 25 and 26 of the connector 20 so as to expose upper portions thereof may be inserted into the recesses 27 and 28 of the cover 23 so as to be fully covered.

Referring to (c) of FIG. 10, while the actuators 30 are oriented to have different driving directions on the connector 20, the connector 20 may be connected to the target product 100. As such, tactile sensations of different directions may be directly provided to the target product 100.

For example, two actuators 30: 31 and 32 may be respectively configured to vibrate in vertical and horizontal directions, and provide tactile sensations of the vertical and horizontal directions to a smartphone display. The actuators 30 may be mounted on a case at locations facing the smartphone display. In addition to the directions of the tactile sensations, the actuators 31 and 32 to be described below may be driven with different frequencies or waveforms and thus various forms of tactile sensations may be mixed to provide a stereo tactile sensation.

FIG. 11 includes schematic views for describing operation of the stereo tactile sensation providing device 10, according to an embodiment of the present invention.

Referring to (a) of FIG. 11, the stereo tactile sensation providing device 10 according to an embodiment may apply an input signal having various waveforms, frequencies, or voltages in order to individually stimulate four types of skin mechanoreceptors.

For example, a low-frequency sine wave, rectangular wave, or triangular wave may be input to stimulate receptors which respond well to a low-frequency band (e.g., Merkel cells and Meissner corpuscles). Alternatively, a high-frequency sine wave, rectangular wave, or triangular wave may be input to stimulate receptors which respond well to a high-frequency band (e.g., Ruffini corpuscles and Pacinian corpuscles).

The same input signal may be applied to the plurality of actuators 30 to increase an amplitude of an output signal.

Alternatively, different input signals may be applied to the plurality of actuators 30. (A) of FIG. 11 shows an example in which a sine wave of a low-frequency band is applied to the first actuator 31 and a rectangular wave of a high-frequency band is applied to the second actuator 32. As another example, as shown in (b) of FIG. 11, different input signals from among a sine wave, a rectangular wave, a triangular wave, etc. may be applied to the actuators 30, and the actuators 30 may output an output signal in various forms based on a combination of the different input signals. The connector 20 may provide synthetic tactile sensations generated by the plurality of actuators 30, and a tactile sensation generated by each actuator 30 may be attenuated and distributed on the connector 20. It is noted that (b) of FIG. 11 shows synthetic signals of the plurality of actuators 30 without considering attenuation.

Meanwhile, an input signal corresponding to audio data may be applied to the actuators 30. For example, an input signal corresponding to a low-frequency band of the audio data may be applied to the first actuator 31, and an input signal corresponding to a high-frequency band of the audio data may be applied to the second actuator 32. As such, four types of skin mechanoreceptors may be effectively stimulated by achieving a stereo haptic effect corresponding to the audio data by using the two actuators.

As another example, tactile sensations based on changes in frequency may be provided by stimulating the receptors by continuously changing the frequency of the input signal of the two actuators from a low-frequency band to a high-frequency band.

Based on the stereo tactile sensation providing device 10 according to an embodiment, simultaneously and individually changing haptic tactile sensations, which are not achievable using only one actuator 30, may be provided by adjusting voltages, frequencies, or waveforms of the plurality of actuators 30. Using mounting locations and directions of the actuators 30 in addition to the voltages, frequencies, or waveforms of the actuators 30, the entirety of the stereo tactile sensation providing device 10 (or the connector 20) may serve as a source for providing tactile sensations.

Figure 12:
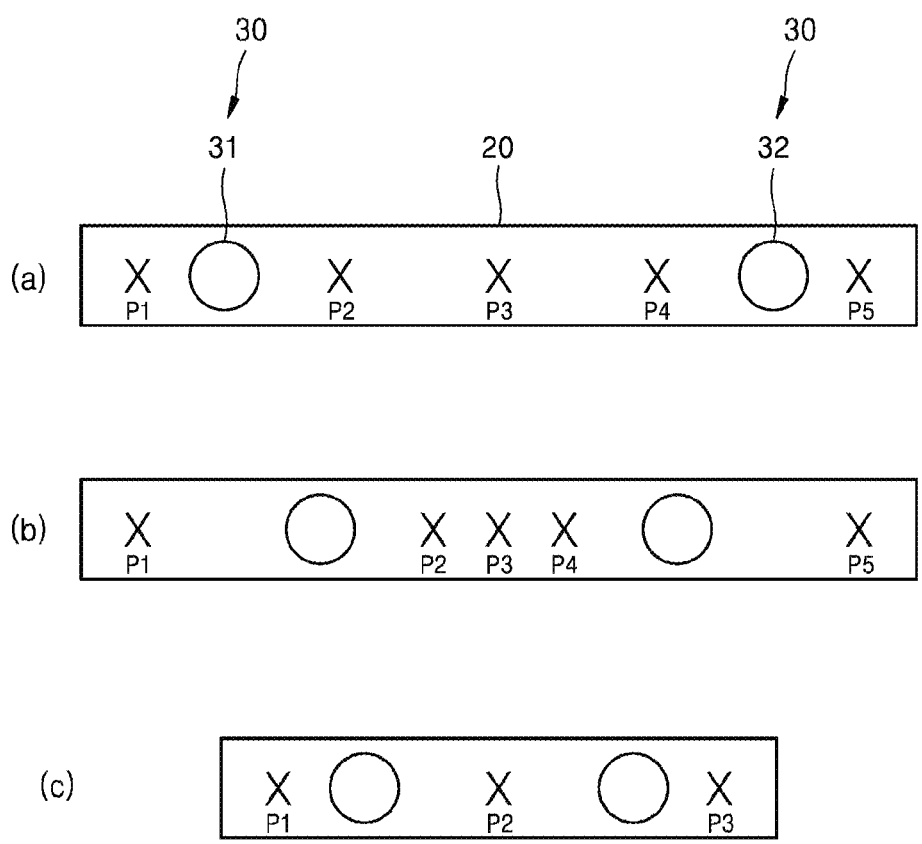
FIGS. 12A-12C include schematic views showing measurement forms of a stereo tactile sensation providing device, according to a test example of the present invention.

FIG. 12 includes schematic views showing measurement forms of the stereo tactile sensation providing device 10, according to a test example of the present invention.

According to a test example, shapes of the connector 20 and vibration forces of the actuators 30 based on input signal conditions were measured. As illustrated in (a), (b), and (c) of FIG. 12, the connector 20 extending in a direction was used. A total of six connectors 20 having lengths of (a) 150 mm, (b) 150 mm, and (c) 90 mm, distances of (a) 85.8 mm, (b) 45.8 mm, and (c) 25.8 mm between the actuators 31 and 32, and open and close types were used for the test (where the open type corresponds to the type illustrated in (a) of FIG. 7 and the close type corresponds to the type illustrated in (b) of FIG. 6). The actuators 31 and 32 were located (a) 20 mm, (b) 40 mm, and (c) 20 mm from left and right ends of the connector 20.

Measurement points in (a) and (b) of FIG. 12 include P1 in a left region, P2 to P4 in a center region, and P5 in a right region, and measurement points in (c) of FIG. 12 include P1 in a left region, P2 in a center region, and P3 in a right region.

A total of four input signal conditions were used based on two actuators 31 and 32 and input signal waveforms of a sine wave and a rectangular wave. Voltages of Sine 1V, 2V, 3V, and 4V were applied to the sine wave, and voltages of Rect 2V, 3V, 4V, and 5V were applied to the rectangular wave. A resonant frequency of 210 Hz was applied to the sine wave, and a resonant frequency of 5 Hz was applied to the rectangular wave.

Figure 13:
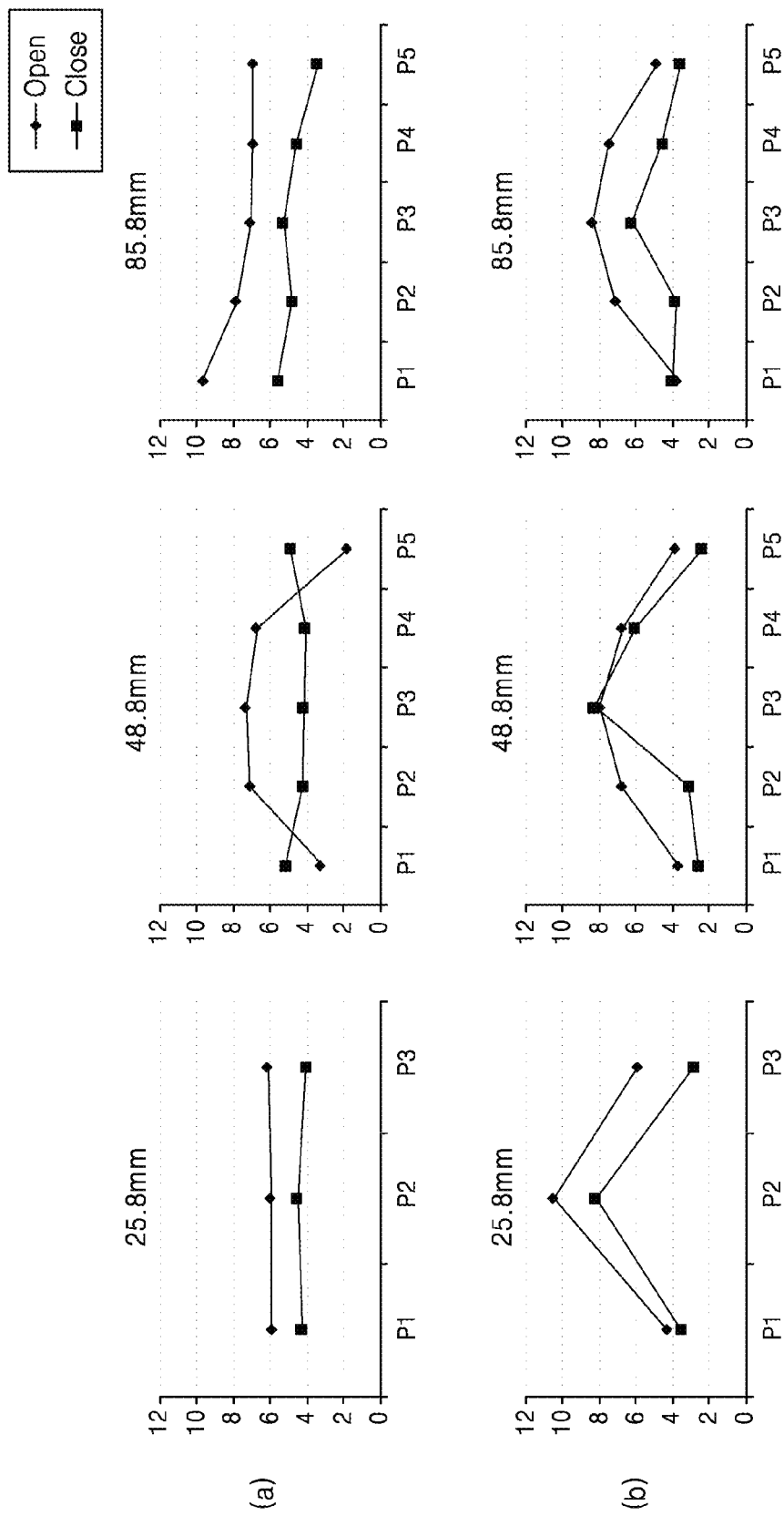
FIGS. 13A-13B and 14A-14B include graphs showing changes in vibration based on a structure of a connector, according to a test example of the present invention.
Figure 14:
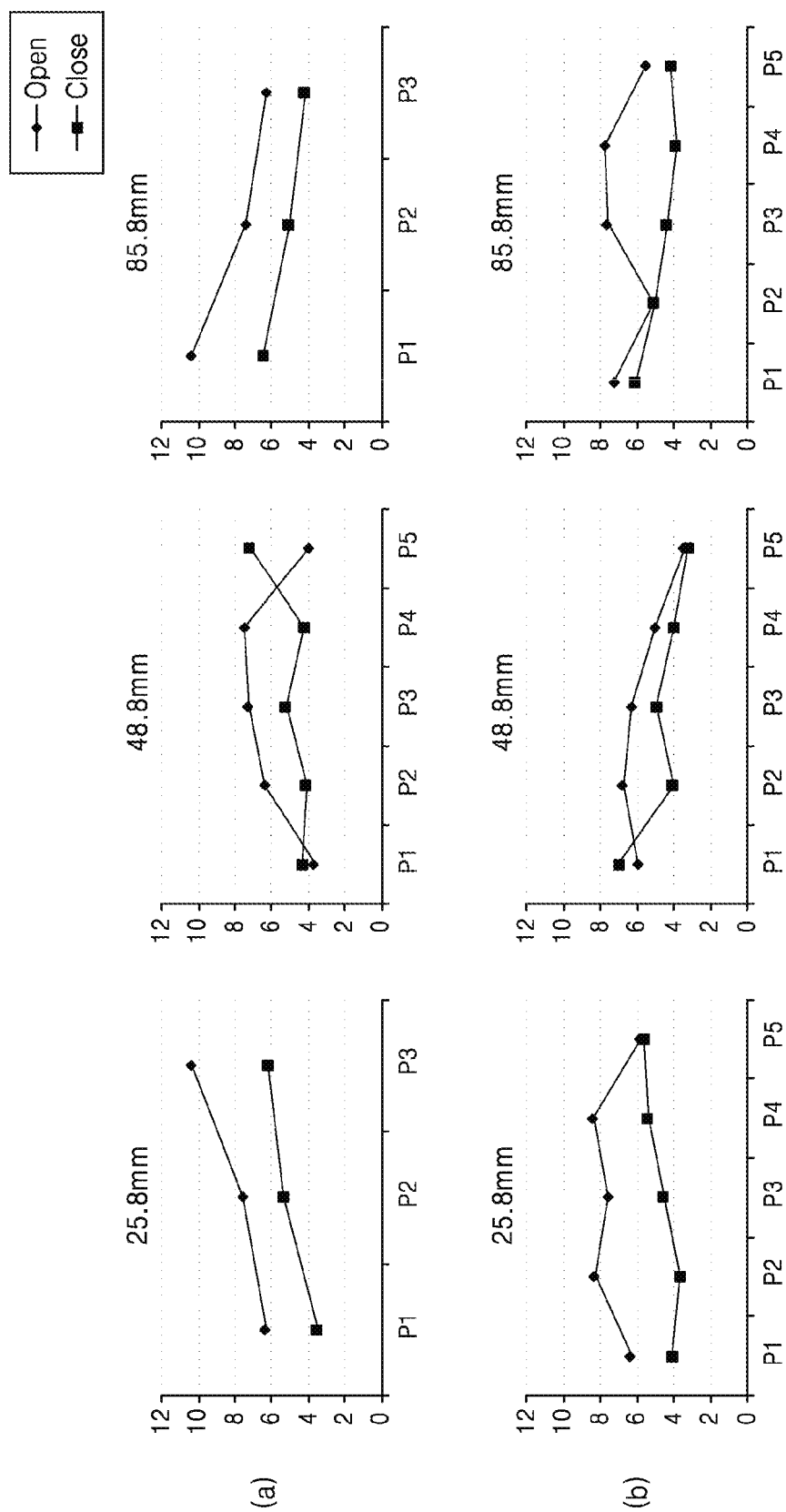

FIGS. 13 and 14 include graphs showing changes in vibration based on a structure of the connector 20, according to a test example of the present invention.

In each graph, A1 indicates driving of the first actuator 31, A2 indicates driving of the second actuator 32, S indicates the sine wave, R indicates the rectangular wave, Open indicates the type in which the actuators 30 protrude from the connector 20 as illustrated in (a) of FIG. 7, Close indicates the type in which the actuators 30 are buried in the connector 20 as illustrated in (b) of FIG. 6, 85.8 mm indicates the measurement form of (a) of FIG. 12, 45.8 mm indicates the measurement form of (b) of FIGS. 12, and 25.8 mm indicates the measurement form of (c) of FIG. 12.

Initially, when the sine wave or the rectangular wave is applied to A1 or A2 to drive only one actuator, a corresponding location exhibits the highest vibration intensity and the vibration intensity decreases away from the location. The open type exhibits higher intensities.

Referring to (a) and (b) of FIG. 13, cases in which the sine wave or the rectangular wave is applied to both A1 and A2 are shown. The open type exhibits higher intensities compared to the close type. It may be resulted that the actuators 30 fitted to penetrate through the connector 20 structurally have less destructive interference and thus exhibit higher forces compared to the buried actuators 30.

Meanwhile, when the rectangular wave is applied to both A1 and A2 as shown in (b) of FIG. 13, all measurement forms of (a), (b), and (c) of FIG. 12 exhibit the highest force at the center, i.e., P3 (see (a) and (b) of FIG. 12) and P2 (see (c) of FIG. 12).

Referring to (a) and (b) of FIG. 14, cases in which a combination of the rectangular wave and the sine wave is applied to A1 and A2 are shown. Like FIG. 13, in FIG. 14, the open type exhibits higher intensities compared to the close type.

Figure 15:
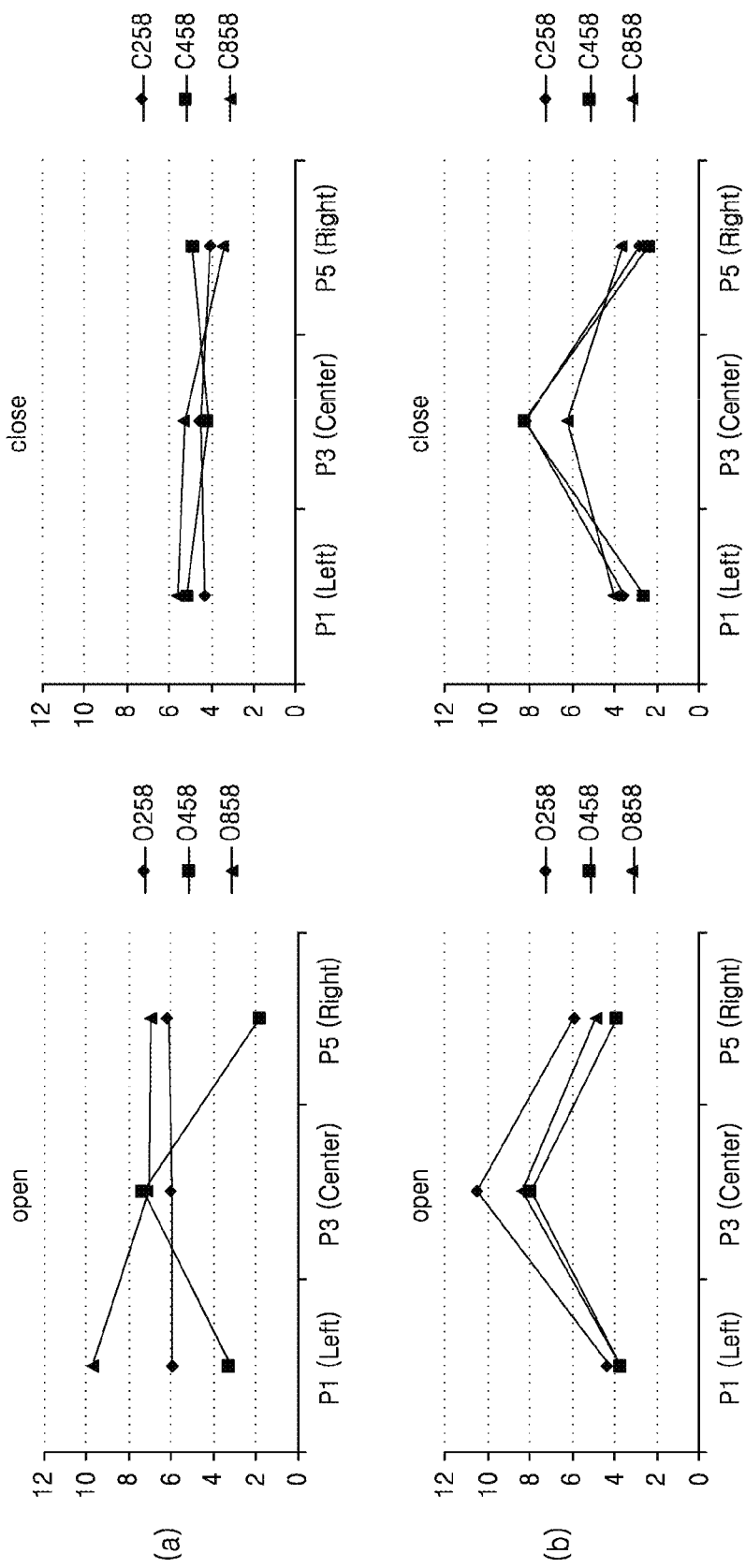
FIGS. 15A-15B and 16A-16B include graphs showing changes in vibration based on a measurement location and a distance between actuators, according to a test example of the present invention.
Figure 16:
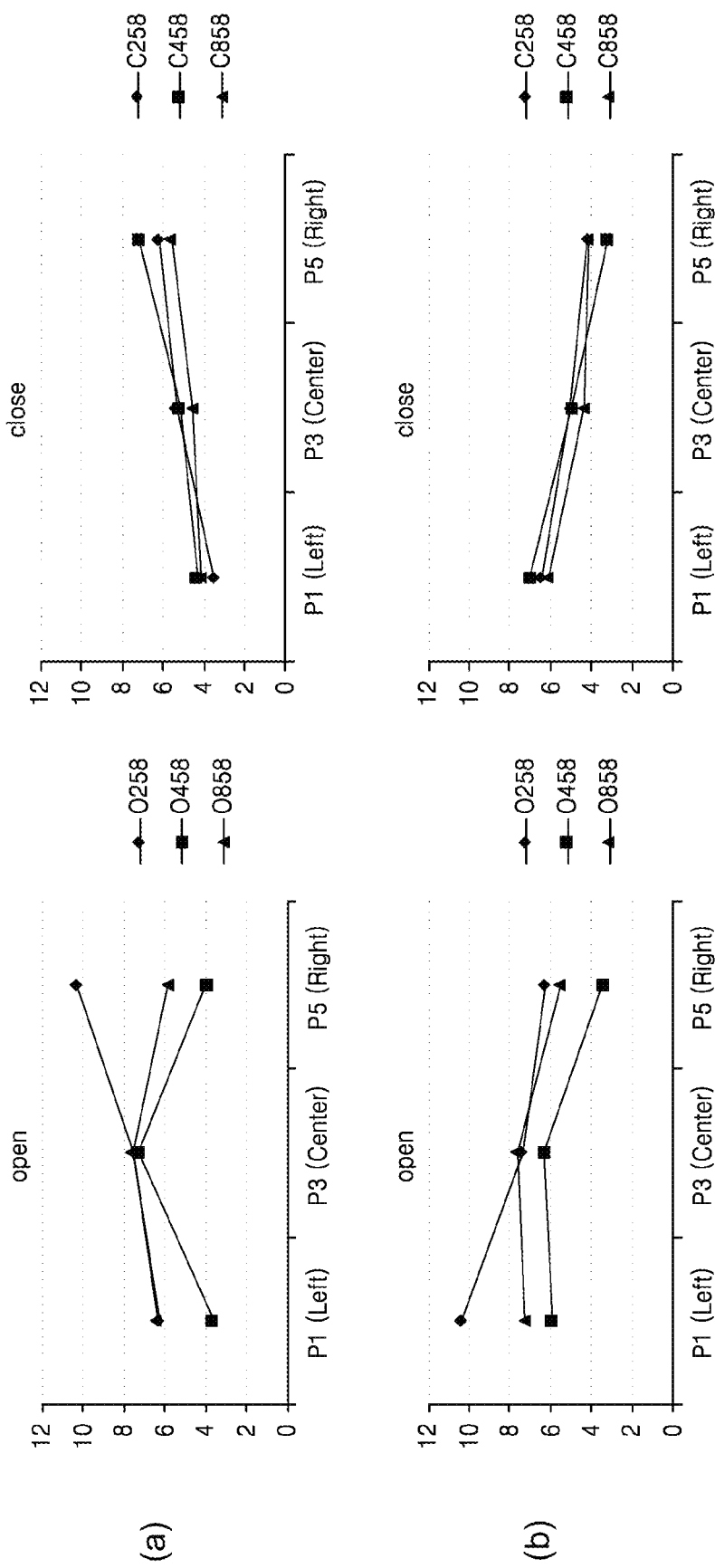

FIGS. 15 and 16 include graphs showing changes in vibration based on a measurement location and a distance between the actuators 30, according to a test example of the present invention.

Initially, when the sine wave or the rectangular wave is applied to A1 or A2 to drive only one actuator, a corresponding location exhibits the highest vibration intensity and the vibration intensity decreases away from the location. Compared to the rectangular wave, the sine wave exhibits intensities more sensitive to the distance.

Referring to (a) and (b) of FIG. 15, cases in which the sine wave or the rectangular wave is applied to both A1 and A2 are shown. The open type exhibits higher intensities compared to the close type.

Meanwhile, when the rectangular wave is applied to both A1 and A2 as shown in (b) of FIG. 15, all measurement forms of (a), (b), and (c) of FIG. 12 exhibit the highest force at the center, i.e., P3 (see (a) and (b) of FIG. 12) and P2 (see (c) of FIG. 12). Therefore, it may be resulted that the rectangular wave exhibits a higher synthetic vibration force at the center.

Referring to (a) and (b) of FIG. 16, A1 or A2 to which the sine wave is applied exhibits a higher force. The close type exhibits a higher linearity compared to the open type, and the open type exhibits a result more sensitive to a source location for applying the sine wave.

Based on the results of FIGS. 12 to 16, structurally, the open type transfers up to 40% more force than the close type. A higher impulse is exhibited at the center when the rectangular wave is synthesized, and similar impulses are exhibited in the form of noise when the sine wave is synthesized. When the sine wave and the rectangular wave are synthesized, a source of the sine wave has a higher impulse and the impulse linearly decreases away from the source. Considering that interference of the sine wave increases in proportion to the distance between the actuators 30, the most efficient locations of the first and second actuators 31 and 32 may include locations corresponding to about ⅓ of the connector 20 or locations spaced apart from ends of the connector 20 by a distance corresponding to about 25% to 35% of a total length of the connector 20.

Figure 17:
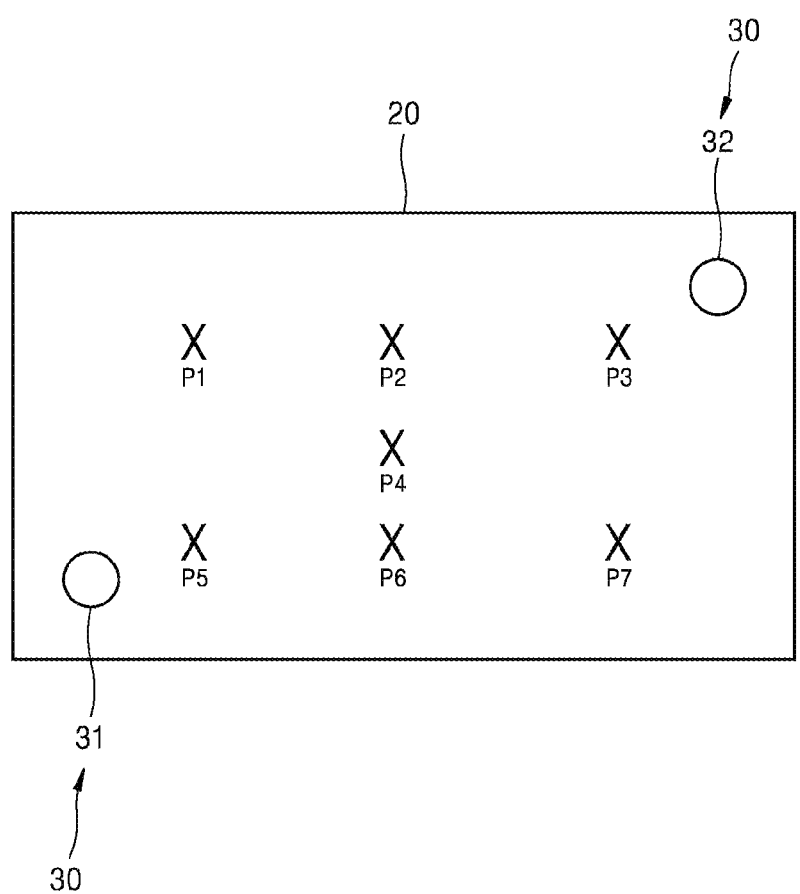
FIG. 17 is a schematic view showing measurement forms of a stereo tactile sensation providing device, according to another test example of the present invention.

FIG. 17 is a schematic view showing measurement forms of the stereo tactile sensation providing device 10, according to another test example of the present invention.

According to a test example, the stereo tactile sensation providing device 10 was connected to a smartphone display and vibration forces of the actuators 30 based on input signal conditions were measured. The connector 20 serves as a rear case of the smartphone, and has a length of about 149 mm and a width of about 68 mm.

The first and second actuators 30: 31 and 32 were disposed in a diagonal direction. Measurement points in FIG. 17 include P1, P2, and P3 in an upper region, P4 in a center region, and P5, P6, and P7 in a lower region.

A total of four input signal conditions were used based on two actuators 31 and 32 and input signal waveforms of a sine wave and a rectangular wave. A voltage of Sine 2V was applied to the sine wave, and a voltage of Rect 3V was applied to the rectangular wave. Resonant frequencies of 100 Hz, 150 Hz, 200 Hz, 250 Hz, and 350 Hz were applied to the sine wave, and resonant frequencies of 5 Hz, 10 Hz, 15 Hz, and 20 Hz were applied to the rectangular wave.

Figure 18:
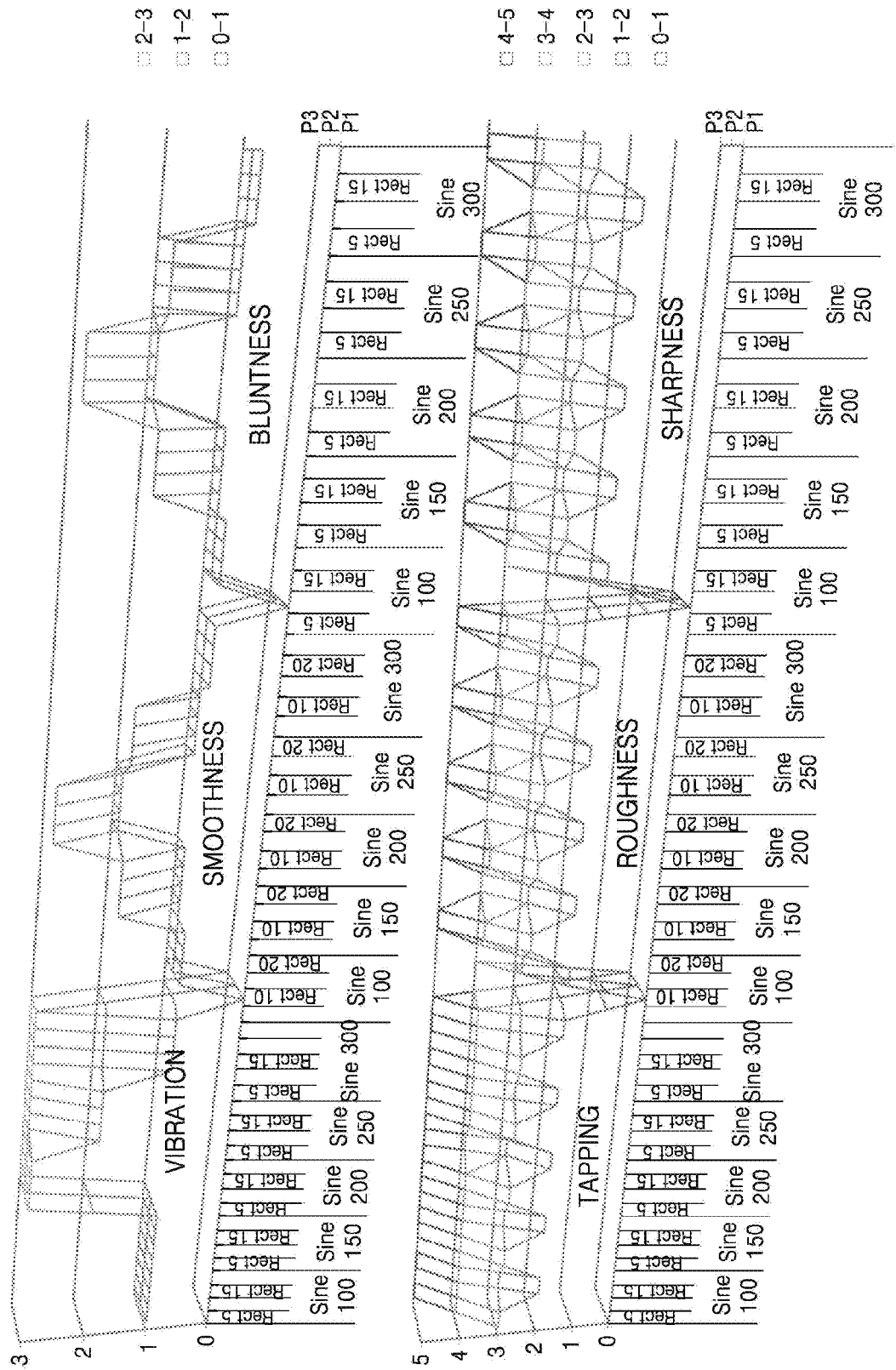
FIGS. 18 to 20 are graphs showing tactile sensations in regions of a stereo tactile sensation providing device, according to another test example of the present invention.
Figure 19:
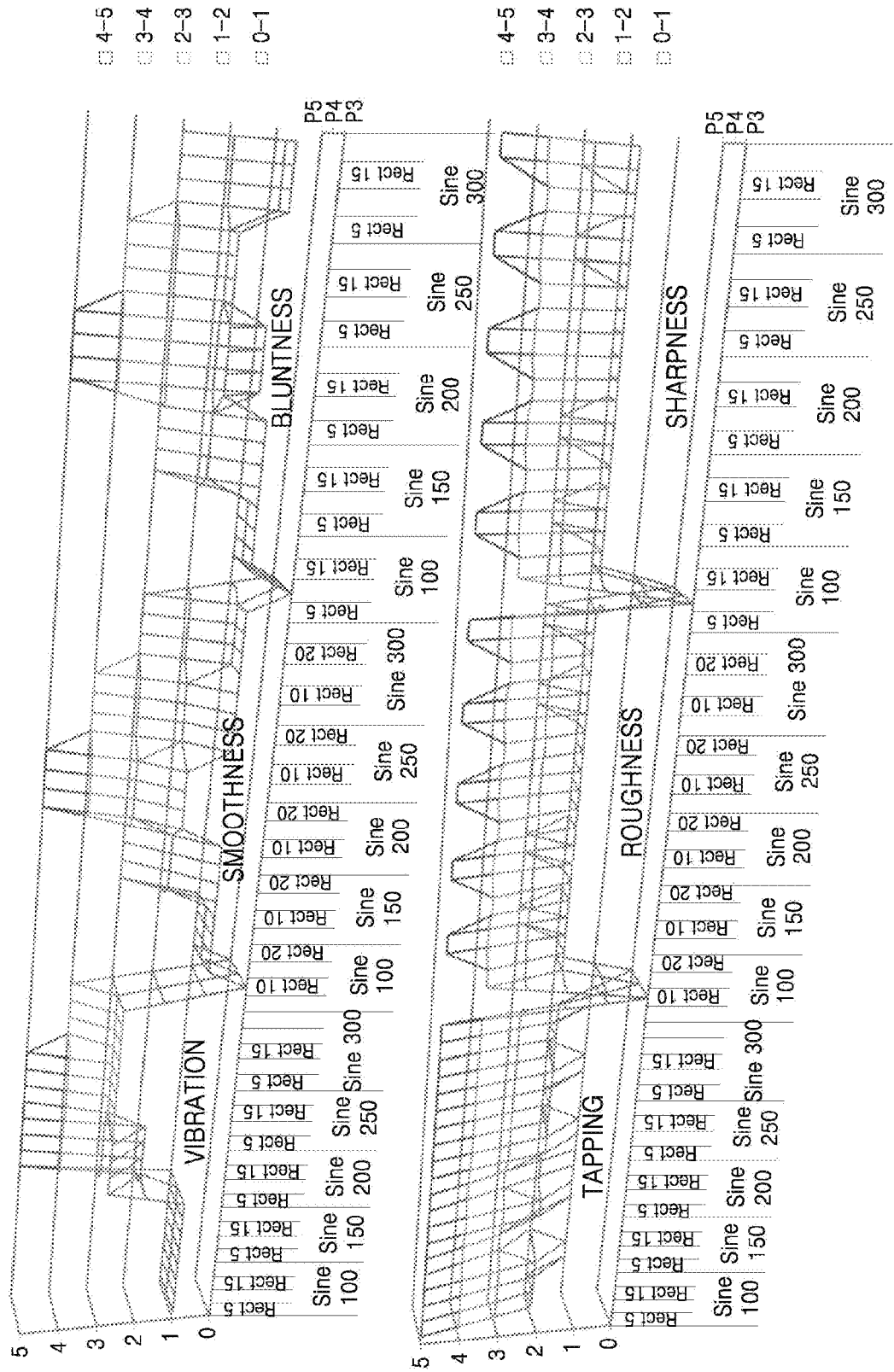
Figure 20:
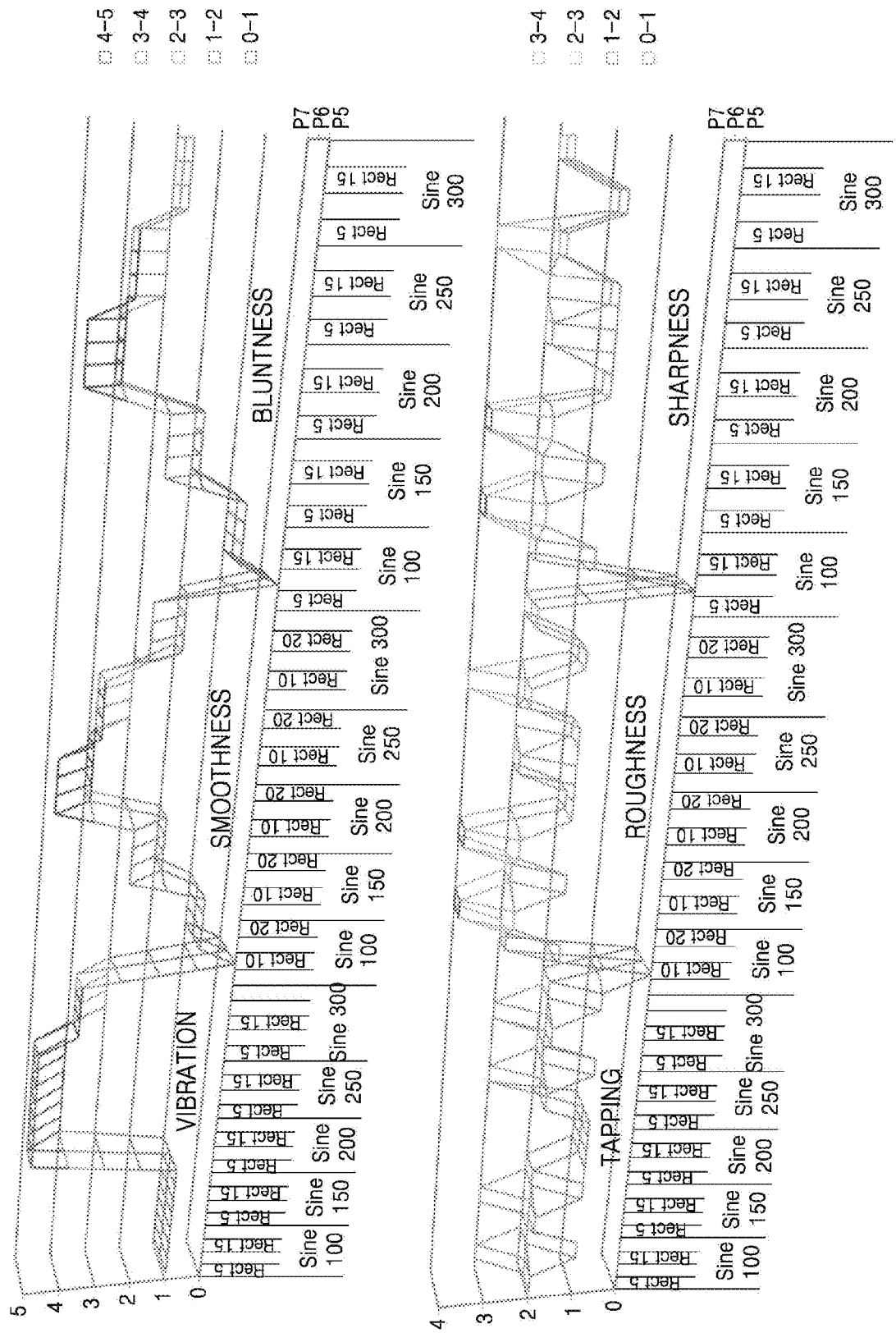

FIGS. 18 to 20 are graphs showing tactile sensations in regions of the stereo tactile sensation providing device 10, according to another test example of the present invention. FIG. 18 shows data measured in the regions P1 to P3, FIG. 19 shows data measured in the regions P3 to P5, and FIG. 20 shows data measured in the regions P5 to P7.

As an example of tactile sensations changing based on a frequency, tactile sensations implementable in a high-frequency band may include weakness and bluntness, and tactile sensations of strongness, fastness, and lightness may be perceived in a higher-frequency band.

In particular, referring to FIGS. 18 to 20, vibration exhibits the maximum impulse at 200 Hz to 250 Hz in all regions of P1 to P7.

A tactile sensation of tapping increases in intensity in a region closer to an actuator, e.g., P3 or P5, and exhibits sensitivity to resonance in the center region.

A tactile sensation of smoothness increases in intensity at a frequency closer to resonance, and increases at a location closer to a source of tapping, but increases in intensity at a location closer to where vibration is strong.

A tactile sensation of roughness decreases in intensity at a location closer to a source of the sine wave, and is exerted regardless of resonance of the sine wave.

A tactile sensation of sharpness increases in intensity at a location closer to a source of the sine wave and at a frequency closer to resonance, but does not proportionally increase above a certain degree.

A tactile sensation of bluntness increases in intensity at a location closer to a source of the rectangular wave, and is exerted regardless of resonance of the sine wave.

Referring back to FIG. 18, in P1 to P3, vibration does not exhibit a significant difference above 200 Hz but the tactile sensations of smoothness and bluntness increase in intensity at a frequency closer to resonance. Based on locations, the tactile sensation of roughness increases toward P3 and the tactile sensations of smoothness and bluntness increase toward P1.

Referring back to FIG. 19, in P3 to P5, vibration does not exhibit a significant difference above 200 Hz but the tactile sensation of smoothness increases at a location closer to a source of the sine wave. The tactile sensations of tapping, roughness, and sharpness are hardly dependent on the sine wave.

Referring back to FIG. 20, in P5 to P7, vibration does not exhibit a significant difference above 200 Hz, and thus it may be resulted that vibration-related characteristics are not significantly different in all regions above 200 Hz. The tactile sensation of tapping exhibits the lowest intensity in the lower center region (i.e., P6).

Based on the results of FIGS. 17 to 20, when applied to the smartphone display, vibration exhibits the maximum impulse and sensations at 200 Hz to 250 Hz (resonant frequency: 210 Hz) of the sine wave. The rectangular wave is not significantly different but exhibits a higher impulse at a higher frequency.

As described above, according to the present invention, various tactile sensations such as vibration, smoothness, bluntness, tapping, roughness, and sharpness may be provided by individually and selectively stimulating skin sensory receptors of a user by driving a plurality of actuators in various frequency bands. In addition, when the plurality of actuators are driven, tactile sensations may be provided in a multi-direction through the whole area of a connector, different types of tactile sensations may be provided from different regions, and thus a stereo tactile sensation may be provided to the user.

While the present invention has been particularly shown and described with reference to embodiments thereof, it will be understood by one of ordinary skill in the art that various changes in form and details may be made therein without departing from the scope of the present invention as defined by the following claims.

The invention claimed is:

1. A stereo tactile sensation providing device, the device comprising:
   a connector connected to a plurality of actuators and including a plurality of tactile regions;
   a controller for applying an operation signal to the plurality of actuators; and
   a tuner for transmitting a control signal to the controller,
   wherein the controller receives the control signal and applies the operation signal to the plurality of actuators,
   wherein the connector provides different tactile sensations for each of the plurality of tactile regions including a tactile region between the plurality of actuators and a tactile region other than between the plurality of actuators,
   wherein the tuner is an application or a tuning tool, the tuning tool comprising any one of scrolls, buttons, and an equalizer, and
   wherein the application or the tuning tool controls at least one of the tactile sensations or intensities of the tactile sensations, and the plurality of tactile regions.

2. The device of claim 1, wherein the connector provides the tactile sensations comprising at least two of vibration, smoothness, bluntness, tapping, roughness, and sharpness.

3. The device of claim 1, wherein fixing guides are mounted on the connector, and
   wherein the plurality of actuators are supported by the fixing guides to be fixed on the connector.

4. The device of claim 1, wherein recesses are provided in the connector, and
wherein the plurality of actuators are rested and fixed in the recesses.

5. The device of claim 1, wherein through-holes are provided to penetrate the connector, and
wherein the plurality of actuators are fitted through the through-holes.

6. The device of claim 1, wherein the connector is made of plastic, metal, glass, rubber, or wood.

7. The device of claim 1, wherein the plurality of actuators are mounted on the connector via a coupling means comprising knobs or an adhesive material.

8. The device of claim 1, wherein at least a part of the connector is connected to a target product to provide the tactile sensations to a user through the target product.

9. The device of claim 1, wherein at least two of the plurality of actuators are mounted on the connector at different angles to provide the tactile sensations in different directions.

10. The device of claim 1, wherein the operation signal includes a first signal for controlling each of the plurality of actuators to stimulate first tactile cells above a threshold, and a second signal for controlling each of the plurality of actuators to stimulate second tactile cells above the threshold.

11. The device of claim 1, wherein the controller controls at least one of voltages, frequencies, and waveforms of the operation signal.

12. The device of claim 1, wherein the first tactile cells comprise Merkel cells and Ruffini corpuscles as slow-adapting (SA) receptors, and
wherein the second tactile cells comprise Meissner corpuscles and Pacinian corpuscles as rapid-adapting (RA) receptors.

* * * * *